United States Patent [19]
Inoue

[11] 3,744,515
[45] July 10, 1973

[54] HYDRAULIC PRESSURE CONTROL VALVE FOR POWER-ASSISTED STEERING SYSTEM

[75] Inventor: Naohiko Inoue, Yokohama, Japan

[73] Assignee: Nissan Motor Company Limited, Yokohoma, Japan

[22] Filed: June 29, 1972

[21] Appl. No.: 267,377

[52] U.S. Cl............... 137/494, 180/79.2 R, 91/458
[51] Int. Cl............................................. B62d 5/08
[58] Field of Search...................... 137/494, 503, 85, 137/115; 91/458; 180/79.2 R

[56] References Cited
UNITED STATES PATENTS

| | | | |
|---|---|---|---|
| 3,693,747 | 9/1972 | Nishikawa........................... | 137/115 |
| 3,692,400 | 9/1972 | Uchigama...................... | 180/79.2 R |

Primary Examiner—Alan Cohan
Attorney—John Lezdey et al.

[57] ABSTRACT

A hydraulic pressure control valve for use in a hydraulic-power control device of a power-assisted steering system of a motor vehicle, which control valve includes a primary and secondary valve spools adapted to vary the effective cross sectional area of a variable flow restriction provided between inlet and outlet sides of the control valve in dependence on the driving speed of the motor vehicle and the steering resistance of the motor vehicle for thereby maintaining a steering-assistance hydraulic pressure to be delivered to a hydraulic reaction chamber at an appropriate value for effecting easy and reliable steering operation of the motor vehicle during various driving conditions of the motor vehicle.

2 Claims, 4 Drawing Figures

HYDRAULIC PRESSURE CONTROL VALVE FOR POWER-ASSISTED STEERING SYSTEM

This invention relates in general to steering systems of motor vehicles and, more particularly, to a hydraulic-power control device for use in a power-assisted steering system of a motor vehicle.

A hydraulic-power control device commonly employed in known motor vehicle generally includes a servo mechanism which is provided with a hydraulic reaction chamber of which the force resulting from hydraulic power for the steering is returned to the steering wheel and a control device by which the hydraulic-power entering the reaction chamber is varied in accordance with the driving speed of the motor vehicle. The control device includes a steering control valve which is adapted to respond to steering resistance and control the hydraulic pressure delivered from an engine driven pump in accordance with the steering resistance and a speed-sensitive control unit which is adapted to produce an electric signal representing the driving speed of the motor vehicle. The hydraulic pressure which has been controlled by the steering-control valve is further controlled by a hydraulic pressure control valve, which is associated with the speed-sensitive control unit in accordance with the driving speed of the motor vehicle before it is directed to the hydraulic reaction chamber. When, for instance, the motor vehicle is driven at a relatively high speed and a relatively great steering resistance is encountered in the steering system, then the hydraulic pressure is controlled to develop a relatively high hydraulic pressure and *vice versa*. The hydraulic pressure to be directed to the reaction chamber is, therefore, not only varied with the steering resistance but regulated in a manner to require more physical effort applied to the steering wheel during high-speed cruising and less physical effort during low-speed driving.

Difficulties are, however, encountered in the performances of the prior art hydraulic pressure control valve of the above outlined nature. Foremost of such difficulties is the fact that the hydraulic pressure to be delivered to the hydraulic reaction chamber can not be precisely varied in accordance with the electric signal delivered from the speed-sensitive control unit and representing the driving speed of the motor vehicle. This invites lacks of stability in steering operations because the force resulting from the hydraulic pressure for the steering is caused to irregularly vary.

The present invention contemplates provision of an improved hydraulic pressure control valve for use in the hydraulic power control device of the power-assisted steering system of the motor vehicle whereby the above noted drawbacks inherent in the prior art counterparts are eliminated.

It is, therefore, an object of the present invention to provide an improved hydraulic pressure control valve for use in a hydraulic-power control device of a power-assisted steering system of a motor vehicle, which control valve is adapted to operate reliably under various driving conditions of the motor vehicle.

Another object of the present invention is to provide an improved hydraulic pressure control valve for use in a hydraulic-power control device of a power-assisted steering system by which proper reactions are imparted to the steering wheel under any driving conditions of the motor vehicle so as to enable the driver to steer the vehicle with sufficient stability.

Still another object of the present invention is to provide an improved hydraulic pressure control valve for use in a hydraulic-power control device of a power-assisted steering system of a motor vehicle by which completely stabilized power-assisted steering is achieved.

A further object of the present invention is to provide an improved hydraulic pressure control valve for use in a hydraulic-power control device of a power-assisted steering control system of a motor vehicle, which hydraulic pressure control valve is simple in construction and easy to manufacture.

These and other objects, features and advantages of the present invention can become more apparent from the following description when taken in conjunction with the accompanying drawings, in which.

Figure 2:
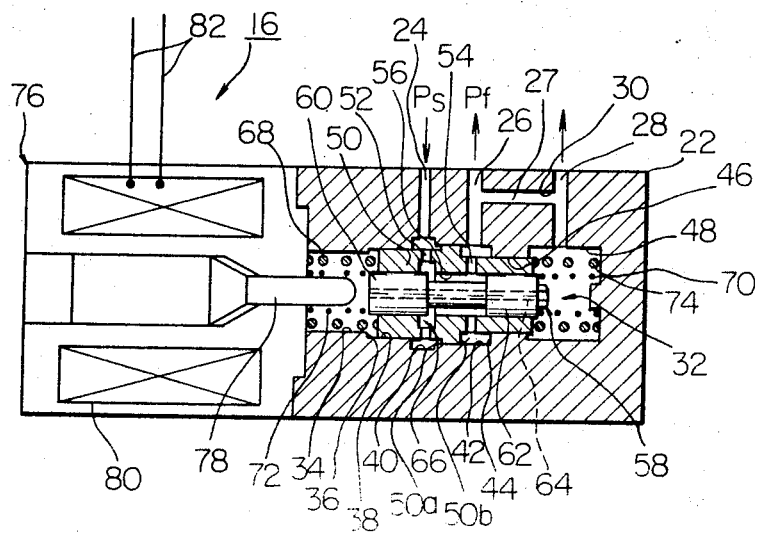
FIG. 2 is a schematic cross-sectional view of a preferred embodiment of the hydraulic pressure control valve shown in FIG. 1.
Figure 3:
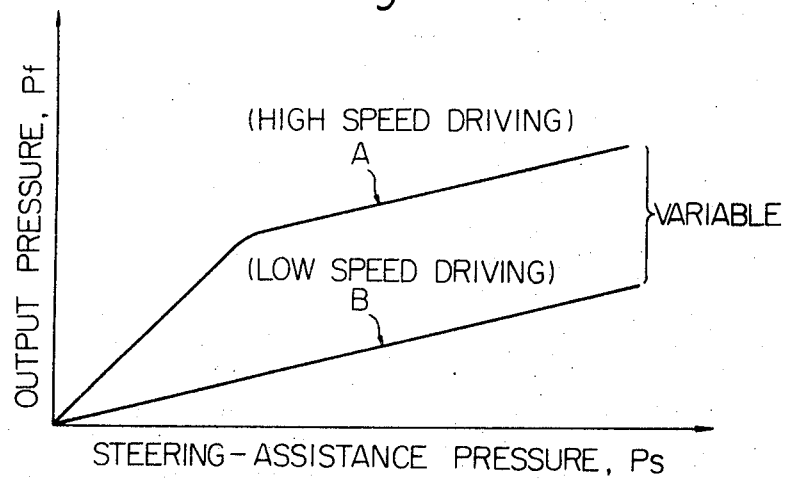
Figure 4:
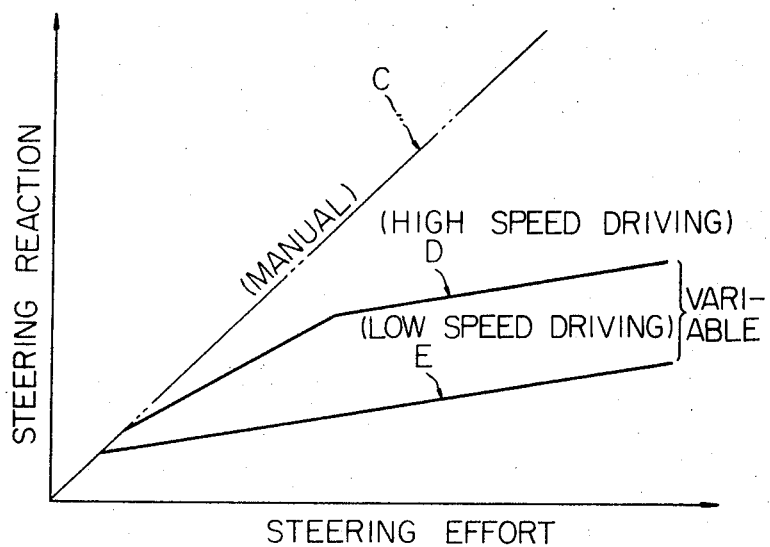

FIG. 3 is a graph showing an example of the variations in pump delivery hydraulic pressure in terms of the controlled or output pressure at two different driving speeds of the motor vehicle as attainable where the hydraulic pressure control valve of FIG. 2 is used; and FIG. 4 is a graph showing an example of the relationship between the steering resistance and steering-assistance power at two different driving speeds of the motor vehicle as attainable by the hydraulic pressure control valve shown in FIG. 2.

Figure 1:
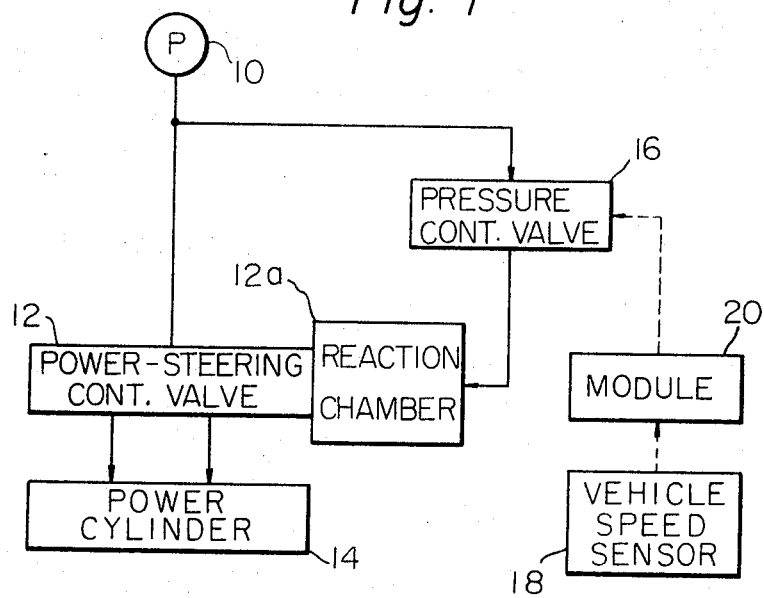
FIG. 1 is a block diagram showing a general construction of a hydraulic-power control device incorporating a hydraulic pressure control valve according to the present invention.

Referring now to the drawings and more particularly to FIG. 1, there is shown in block form a general construction of a hydraulic-power control device incorporating the hydraulic pressure control valve according to the present invention. As shown, the hydraulic-power control device includes a source 10 of hydraulic pressure such as a constant delivery pump (usually driven by an engine of the motor vehicle), and a power-steering control valve 12 having a hydraulic reaction chamber 12a which control valve 12 is hydraulically connected to the source 10 of hydraulic pressure and which is responsive to steering resistance from front wheels of the motor vehicle to develop a steering-assistance hydraulic pressure $P_s$ in accordance therewith which is supplied to a steering power cylinder 14 for effecting steering of the motor vehicle. This steering-assistance hydraulic pressure $P_s$ is also directed to the hydraulic pressure control valve of the present invention, which is indicated at 16, through a hydraulic line. The hydraulic-power control device also includes a vehicle speed sensor 18 which is responsive to the driving speeds of the motor vehicle and producing an electric signal corresponding thereto. This electric signal is delivered to a module 20 which is adapted to convert and amplify the input signal into an appropriate control signal, which is applied to the hydraulic pressure control valve 16 so that the controlled or output pressure $P_s$ supplied to the hydraulic pressure control valve 16 is modulated by the control signal from the module 20 thereby to develop a finally controlled hydraulic pressure $P_f$ which is to be directed to the reaction chamber 12a through a hydraulic line. It should be noted that the module 20 may be designed such that the control signal produced thereby increases as the driving speed of the motor vehicle decreases.

A detail construction of the hydraulic pressure control valve 16 is shown in FIG. 2. As shown, the hydraulic pressure control valve 16 includes a valve body 22 having formed therein an inlet passageway 24 which communicates with the power-steering control valve 12 for receiving the steering-assistance hydraulic pressure $P_s$, an outlet passageway 26 which communicates with the hydraulic reaction chamber 12a for delivering the finally controlled or output hydraulic pressure $P_f$ thereto, a discharge passageway 28 which communicates with a reservoir (not shown) of the source 10 of hydraulic pressure, and a flow restriction or orifice 30 of constant effective sectional area which is located in a branch passageway 27 communicating with the passageways 26 and 28, respectively. The valve body 22 also has a fluid chamber or bore 32 which provides fluid communication between the inlet and outlet passageways 24 and 26. The bore 32 is symmetrical about its longitudinal axis and is of stepped diameter to provide axially successive bore portions of varying cross sectional area with shoulders intermediate the bore portions. These bore portions and shoulders include a bore portion 34, an annular radial shoulder 36, a bore portion 38, an annular groove 40, a bore portion 42, an annular radial shoulder 44, a bore portion 46, and a bore portion 48. A primary valve spool or valve element 50 is slidably accomodated with the fluid chamber 32 and axially movable therein. This valve element 50 has opposed smaller and larger working surfaces 50a and 50b, the smaller working surface 50a being exposed to the hydraulic pressure in the inlet passageway 24 whereas the larger working surface 50b is exposed to the hydraulic pressure in the outlet passageway 26. The primary valve element 50 is formed with inlet and outlet ports 52 and 54, the inlet port 54 communicating with the inlet passageway 24 while the outlet port communicates with the outlet passageway 26, and a fluid chamber or bore 56 which provides fluid communication between the inlet and outlet ports 52 and 54.

A secondary valve spool or valve element 58 is slidably accommodated within the fluid chamber 56 formed in the primary valve spool 50. This valve element 58 has spaced valve lands 60 nd 62, and a fluid passageway 64 axially extending therethrough for providing fluid communication between the bores 34 and 48.

It is an important feature of the present invention that a variable flow restriction 66 is provided between the inlet and outlet ports 52 and 54 formed in the primary valve spool 50 while the flow restriction 30 is provided in the branch passageway 27 upstream of the exhaust passageway 28. The variable flow restriction 66 is shown as defined by the valve land 60 of the secondary valve spool 58 and the inlet port 52 formed therein. This construction is advantageous in that, since the hydraulic pressure to be delivered to the outlet passageway 26 is prevented from being excessively decreased even when the flow restriction 30 is clogged by a dust or dusts, a safety and reliable steering operation will be obtained.

As shown in FIG. 2, the primary valve spool 50 is held in a balanced position by a pair of compression springs 68 and 70 disposed in the bore portions 34 and 48, respectively. Similarly, the secondary valve spool 58 is held in a balanced position by a pair of compression springs 72 and 74 disposed in the bore portions 34 and 48, respectively.

With this arrangement, the primary valve spool 50 is axially movable when there is a difference between the pressure acting upon the smaller and larger working surfaces 50a and 50b, respectively, and rests in a balanced position when such pressures are equalized. Thus, the controlled or output hydraulic pressure $P_f$ is maintained at an appropriate value in dependence on the steering-assistance hydraulic pressure $P_s$ delivered from the power-steering control valve 12.

As previously stated, the controlled or output hydraulic pressure $P_f$ to be delivered to the reaction chamber 12a is further modulated by the control signal transmitted from the module 20. To this end, the hydraulic pressure control valve 16 further includes an actuating means 76 which is adapted to move the secondary valve spool 58 to different positions in varying degrees in accordance with the variations in the magnitude of the control signal transmitted from the module 20 to vary the effective sectional area of the variable flow restriction 66 so that the controlled or output hydraulic pressure $P_f$ is modulated in accordance with the supplied hydraulic pressure $P_s$ and the driving speed of the motor vehicle. In the illustrated embodiment, the actuating means 76 is shown as consisting of a solenoid having a plunger 78 cooperating with one end of the secondary valve spool 58 and a solenoid coil 80 which is electrically connected to the module 20 through wires 82. The plunger 78 and, accordingly, the secondary valve spool 58 are axially movable responsively to energization of the solenoid coil 80 in a right-hand direction, as viewed in the drawing, the amount of such movement corresponding to the magnitude of the control signal transmitted from the module 20.

When, in operation, the steering-assistance hydraulic pressure $P_s$ delivered from the steering control valve 12 is transmitted through the inlet passageway 24 formed in the valve body 22 of the hydraulic pressure control valve 16 to the inlet port 52 formed in the primary valve spool 50. The steering-assistance hydraulic pressure in the inlet port 52 is then passed through the variable flow restriction 66, where the steering-assistance hydraulic pressure is modulated to an appropriate level, to the outlet port 54. The hydraulic pressure thus modulated and delivered to the outlet port 54 is delivered to the outlet passageway 26, through which a part of the hydraulic pressure is directed to the exhaust passageway 28 through the flow restriction 30 in the branch passageway 27 so that the hydraulic pressure is further modulated to obtain a finally modulated controlled or output hydraulic pressure $P_f$ which is to be directed to the reaction chamber 12a. The hydraulic pressure delivered to the exhaust passageway 28 is returned to the reservoir tank (not shown) of the source 10 of hydraulic pressure.

It will be noted in this instance that the steering-assistance hydraulic pressure $P_s$ in the inlet passageway 24 acts on the smaller working surface 50a of the primary valve spool 50 while the controlled or output hydraulic pressure $P_f$ in the outlet passageway 26 acts on the larger working surface 50b of the primary valve spool 50. Consequently, the primary valve spool 50 is caused to move leftwardly of the drawing, that is, in a direction to decrease the effective cross sectional area of the variable flow restriction 66 and rests in a balanced position where the forces acting on the primary valve spool 50 are equalized. It will thus be seen that the controlled or output hydraulic pressure $P_f$ can be modulated by varying the effective cross sectional area of the variable flow restriction 66 to different degrees in dependence on the steering-assistance hydraulic pressure $P_s$. If, now, the effective cross sectional areas of the smaller and larger working surfaces 50a and 50b of the primary valve spool 50 are denoted by $A_s$ and $A_f$, respectively, where $A_s < A_f$, then the following equilibrium equation holds:

$$A_f \cdot P_f = A_s \cdot P_s + 2 \, K \cdot X_i$$

where $K$ = spring constant of the compression spring 68 and 70, and $X_i$ = effective cross sectional area of the variable flow restriction 66 where the steering-assistance hydraulic pressure $P_s$ is zero and where the amount of the control signal delivered to the solenoid coil 80 of the solenoid is $i$.

As the vehicle speed decreases, the magnitude of the control signal transmitted from the modulator 20 increases so that the solenoid coil 80 is energized to apply a large magnitude of electromagnetic force on the plunger 78. Consequently, the plunger 78 is moved rightwardly of the drawing to cause the secondary valve spool 58 to move in a direction to decrease the effective cross sectional area of the variable flow restriction 66 until equilibrium is achieved between the magnetic force of the solenoid coil 80 and the pair of compression springs 72 and 74. Under this condition, the controlled or output hydraulic pressure $P_f$ is controlled by, in addition to the steering-assistance hydraulic pressure $P_s$, the driving speed of the motor vehicle and thus the controlled or output hydraulic pressure $P_f$ relating to these parameters will be obtained. The hydraulic pressure $P_f$ thus modulated is transmitted to the hydraulic reaction chamber 12a to apply a proper reaction on the steering wheel.

When steering at parking, there is no electric signal produced from the vehicle speed sensor 18 and, consequently, the magnitude of the control signal generated by the module 20 is maximum so that the plunger 78 and accordingly the secondary valve spool 58 are moved rightwardly of the drawing for a maximum distance. This causes the afore-mentioned effective cross sectional area $X_i$ to become minimum with a result that the output hydraulic pressure $P_f$ to be supplied to the reaction chamber 12a is low whereby the force resulting therefrom for the steering is small even when the steering resistance is increased thereby to increase the level of the steering-assistance hydraulic pressure $P_s$.

When, in contrast, as the vehicle speed increases, the magnitude of the control signal generated by the module 20 decreases so that the amount of displacement of the plunger and accordingly the secondary valve spool 58 becomes small for thereby increasing the effective cross sectional area $X_i$ of the variable flow restriction 66. In this instance, if the steering resistance is increased thereby to increase the level of the steering-assistance hydraulic pressure $P_s$, this increased hydraulic pressure $P_s$ acts on the working surface 50a of the primary valve spool 50. Consequently, the primary valve spool 50 is moved rightwardly, as viewed in FIG. 2, thereby increasing the effective cross sectional area of the variable flow restriction 66. Thus, the output hydraulic pressure $P_f$ is maintained at a higher value whereby the force resulting therefrom is large to provide safety of steering operation.

FIG. 3 represents an example of the relationships between the controlled or output hydraulic pressure $P_f$ (on the axis of ordinate) and the pump delivery pressure $P_s$ (on the axis of abscissa), as attainable in the hydraulic pressure control valve shown in FIG. 2. The curve A indicates such relationship achieved during high speed driving of the motor vehicle while the curve B designates the relationship achieved during low speed driving of the motor vehicle.

FIG. 5 illustrates an example of the relationship between the steering reaction (on the axis of ordinate) and the steering resistance (on the axis of abscissa), as attainable by the hydraulic pressure control valve shown in FIG. 2. In FIG. 5, the phantom line designated at C represents the relationship achieved by a conventional manual steering device. The curve D indicates the relationship achieved during high speed driving of the motor vehicle while the curve E indicates the relationship achieved during low speed driving of the motor vehicle.

It will now be understood that the hydraulic pressure control valve embodying the present invention is capable of providing ease and reliability of power-assisted steering for various driving conditions of the motor vehicle by a simplified means.

It should be noted that while, in the illustrated embodiment, the actuating means forming part of the hydraulic pressure control valve of the present invention has been shown and described as consisting of a solenoid which is energized by an electric signal representing the driving speed of the motor vehicle, the actuating means may comprises a hydraulic device having a plunger which is adapted to move in response to a pressure signal generated by a fluid pressure governor valve.

What is claimed is:

1. A hydraulic pressure control valve for use in a hydraulic-power control device of a power-assisted steering system of a motor vehicle, which control device includes a source of hydraulic pressure and a power-steering control valve communicating with said source of hydraulic pressure for controlling hydraulic pressure delivered therefrom in dependence on the steering resistance of the motor vehicle and having a reaction chamber, said hydraulic pressure control valve comprising: a valve body having formed therein an inlet passageway communicating with said source of hydraulic pressure and said power-steering control valve, an outlet passageway communicating with said reaction chamber of said power-steering control valve, a discharge passageway communicating with said outlet passageway, a flow restriction of constant effective cross sectional area located between said outlet passageway, and said discharge passageway, and a bore which provides fluid communication between said inlet and outlet passageways; a primary valve spool slidably accommodated in said bore of said valve body and having opposed, larger and smaller working surfaces, the larger working surface being subjected to output hydraulic pressure in said outlet passageway and the smaller working surface being subjected to input hydraulic pressure in said inlet passageway, said primary valve spool also having an inlet port communicating with said inlet passageway, an outlet port communicating with said outlet passageway, and a bore for providing fluid communication between said inlet and outlet ports; a first pair of spring means disposed in the bore of said valve body for biasing said primary valve spool in its balanced position; a secondary valve spool slidably accommodated in the bore of said primary valve spool; a second pair of spring means disposed in the bore of said valve body for biasing said secondary valve spool in its balanced position; a variable flow restriction provided between said inlet and outlet ports of said primary valve spool, the effective cross sectional area of said variable flow restriction being controlled by a force resulting from said output hydraulic pressure acting upon said larger working surface of said primary valve spool opposing a force resulting from said input hydraulic pressure acting upon said smaller working surface of said primary valve spool; and actuating means having a plunger cooperating with one end of said secondary valve spool, said actuating means being arranged to cause said plunger to move said secondary valve spool in dependence on the driving speed of the motor vehicle, whereby the effective cross sectional area of said variable flow restriction is further controlled in dependence on the driving speed of the motor vehicle.

2. A hydraulic pressure control valve as claimed in claim 1, wherein said actuating means comprises a solenoid having a solenoid coil which is associated with said plunger, said solenoid coil being energized to move said plunger to different positions in dependence on an electric signal representing the driving speed of the motor vehicle.

* * * * *

UNITED STATES PATENT OFFICE
CERTIFICATE OF CORRECTION

Patent No. 3,744,515    Dated July 10, 1973

Inventor(s) Naohiko Inoue

It is certified that error appears in the above-identified patent and that said Letters Patent are hereby corrected as shown below:

Covering Page, Column 1, After "[21] Appl. No.: 267,377" and Before "[52]" insert
--[30] Foreign Application Priority Data
    July 15, 1971    Japan................46-61598--

Signed and sealed this 6th day of August 1974.

(SEAL)
Attest:

McCOY M. GIBSON, JR.    C. MARSHALL DANN
Attesting Officer    Commissioner of Patents